United States Patent
Rastrow et al.

(10) Patent No.: US 10,032,463 B1
(45) Date of Patent: Jul. 24, 2018

(54) SPEECH PROCESSING WITH LEARNED REPRESENTATION OF USER INTERACTION HISTORY

(71) Applicant: Amazon Technologies, Inc., Seattle, WA (US)

(72) Inventors: Ariya Rastrow, Seattle, WA (US); Nikko Ström, Kirkland, WA (US); Spyridon Matsoukas, Hopkinton, MA (US); Markus Dreyer, Seattle, WA (US); Ankur Gandhe, Seattle, WA (US); Denis Sergeyevich Filimonov, Seattle, WA (US); Julian Chan, Seattle, WA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 14/982,587

(22) Filed: Dec. 29, 2015

(51) Int. Cl.
| | |
|---|---|
| *G10L 15/183* | (2013.01) |
| *G10L 15/197* | (2013.01) |
| *G10L 15/16* | (2006.01) |
| *G10L 25/30* | (2013.01) |
| *G10L 15/26* | (2006.01) |
| *G10L 15/06* | (2013.01) |
| G10L 15/22 | (2006.01) |

(52) U.S. Cl.
CPC .......... *G10L 25/30* (2013.01); *G10L 15/063* (2013.01); *G10L 15/16* (2013.01); *G10L 15/197* (2013.01); *G10L 15/26* (2013.01); *G10L 15/183* (2013.01); *G10L 2015/0638* (2013.01); *G10L 2015/228* (2013.01)

(58) Field of Classification Search
CPC ....... G10L 15/08; G10L 15/183; G10L 15/19; G10L 15/15; G10L 15/197; G10L 15/16; G10L 15/22; G10L 2015/228
USPC ......................................... 704/232, 251, 257
See application file for complete search history.

(56) References Cited

U.S. PATENT DOCUMENTS

| | | | | |
|---|---|---|---|---|
| 5,148,385 | A * | 9/1992 | Frazier ...................... | G06N 3/10 706/41 |
| 8,826,226 | B2 * | 9/2014 | Wu ...................... | G06F 17/2715 704/231 |
| 8,843,482 | B2 * | 9/2014 | Buriano ............ | G06F 17/30035 707/732 |

(Continued)

OTHER PUBLICATIONS

Chen, Xie, et al. "Efficient GPU-based training of recurrent neural network language models using spliced sentence bunch." Interspeech, Sep. 2014, pp. 641-645.*

(Continued)

*Primary Examiner* — James Wozniak
(74) *Attorney, Agent, or Firm* — Knobbe Martens Olson & Bear, LLP

(57) ABSTRACT

An automatic speech recognition ("ASR") system produces, for particular users, customized speech recognition results by using data regarding prior interactions of the users with the system. A portion of the ASR system (e.g., a neural-network-based language model) can be trained to produce an encoded representation of a user's interactions with the system based on, e.g., transcriptions of prior utterances made by the user. This user-specific encoded representation of interaction history is then used by the language model to customize ASR processing for the user.

20 Claims, 5 Drawing Sheets

(56) References Cited

U.S. PATENT DOCUMENTS

| | | | | |
|---|---|---|---|---|
| 9,037,464 | B1* | 5/2015 | Mikolov | G06F 17/2785 |
| | | | | 704/255 |
| 9,153,231 | B1* | 10/2015 | Salvador | G10L 15/065 |
| 9,263,036 | B1* | 2/2016 | Graves | G10L 15/16 |
| 9,324,323 | B1* | 4/2016 | Bikel | G10L 15/183 |
| 2003/0171921 | A1* | 9/2003 | Manabe | G06K 9/00335 |
| | | | | 704/232 |
| 2007/0127688 | A1* | 6/2007 | Doulton | G10L 15/265 |
| | | | | 379/265.01 |
| 2008/0063155 | A1* | 3/2008 | Doulton | H04M 3/4936 |
| | | | | 379/88.14 |
| 2014/0257795 | A1* | 9/2014 | Birnbaum | G06F 17/2765 |
| | | | | 704/9 |
| 2015/0066496 | A1* | 3/2015 | Deoras | G10L 15/16 |
| | | | | 704/232 |
| 2015/0120296 | A1* | 4/2015 | Stern | G10L 15/30 |
| | | | | 704/236 |
| 2015/0340034 | A1* | 11/2015 | Schalkwyk | G10L 15/26 |
| | | | | 704/235 |
| 2016/0163310 | A1* | 6/2016 | Lee | G10L 15/16 |
| | | | | 704/232 |
| 2016/0210551 | A1* | 7/2016 | Lee | G06F 17/27 |
| 2016/0307564 | A1* | 10/2016 | Sethy | G10L 15/16 |
| 2017/0046510 | A1* | 2/2017 | Chen | G06F 21/552 |
| 2017/0111515 | A1* | 4/2017 | Bandyopadhyay | H04M 15/41 |
| 2017/0124596 | A1* | 5/2017 | Wang | G06Q 30/0269 |
| 2017/0140384 | A1* | 5/2017 | Zoldi | G06Q 20/4016 |
| 2017/0149813 | A1* | 5/2017 | Wright | H04L 63/1425 |

OTHER PUBLICATIONS

Graves, Alex, et al. "Speech recognition with deep recurrent neural networks." 2013 IEEE international conference on acoustics, speech and signal processing. IEEE, May 2013, pp. 6645-6649.*

Graves, Alex, et al. "Hybrid speech recognition with deep bidirectional LSTM." Automatic Speech Recognition and Understanding (ASRU), 2013 IEEE Workshop on. IEEE, Dec. 2013, pp. 273-278.*

Hannun, Awni, et al. "Deep speech: Scaling up end-to-end speech recognition." arXiv preprint arXiv:1412.5567, Dec. 2014, pp. 1-12.*

Kombrink, Stefan, et al. "Recurrent Neural Network Based Language Modeling in Meeting Recognition." Interspeech. vol. 11. Aug. 2011, pp. 2877-2880.*

Mikolov, Tomáš, et al. "Extensions of recurrent neural network language model." 2011 IEEE International Conference on Acoustics, Speech and Signal Processing (ICASSP). IEEE, May 2011, pp. 5528-5531.*

Mikolov, Tomas, et al. "Context dependent recurrent neural network language model." SLT. Nov. 2012, p. 1-6.*

Sundermeyer, Martin, et al. "Comparison of feedforward and recurrent neural network language models." 2013 IEEE International Conference on Acoustics, Speech and Signal Processing. IEEE, May 2013, pp. 8430-8434.*

Si, Yujing, et al. "A Prefix Tree Based n-best List Re-scoring Strategy for Recurrent Neural Network Language Model." Chinese Journal of Electronics 23.1, Jan. 2014, pp. 70-74.*

Chong, Tze Yuang, et al. "Decoupling word-pair distance and co-occurrence information for effective long history context language modeling." IEEE/ACM Transactions on Audio, Speech, and Language Processing 23.7, Apr. 2015, pp. 1221-1232.*

He, Tianxing, et al. "Recurrent neural network language model with structured word embeddings for speech recognition." 2015 IEEE International Conference on Acoustics, Speech and Signal Processing (ICASSP). IEEE, Apr. 2015, pp. 5396-5400.*

Zhang, Shiliang, et al. "A Fixed-Size Encoding Method for Variable-Length Sequences with its Application to Neural Network Language Models." arXiv preprint arXiv:1505.01504, Jun. 2015, pp. 1-7.*

Falavigna, Daniele, et al. "A frame based spoken dialog system for home care." Interspeech. Sep. 2005, pp. 1-4.*

Cho et al., "Learning Phrase Representations using RNN Encoder-Decoder for Statistical Machine Translation," Proceedings of the Empirical Methods in Natural Language Processing (EMNLP), Sep. 3, 2014, 15 pages.

* cited by examiner

SPEECH PROCESSING WITH LEARNED REPRESENTATION OF USER INTERACTION HISTORY

BACKGROUND

Models representing data relationships and patterns, such as functions, algorithms, systems, and the like, may accept input (sometimes referred to as an input vector), and produce output (sometimes referred to as an output vector) that corresponds to the input in some way. In some implementations, a model is used to generate a likelihood or set of likelihoods that the input corresponds to a particular value. For example, an automatic speech recognition ("ASR") system may utilize various models to recognize speech, such as an acoustic model and a language model. The acoustic model is used on acoustic features of audio data to generate hypotheses regarding which words or subword units (e.g., phonemes) correspond to an utterance represented by the audio data. The language model is used to determine the most likely transcription of the utterance based on the acoustic model hypotheses and the features of the language modelled by the language model.

Some ASR systems use artificial neural networks ("NNs"), including deep neural networks ("DNNs"), to model speech (e.g., a NN-based acoustic model or language model). The neural networks are artificial in the sense that they are computational entities, analogous to biological neural networks in animals, but implemented by computing devices. Scores in NN-based models are obtained by doing a "forward pass." The forward pass involves multiplying large NN weight matrices, representing the parameters of the model, by vectors corresponding to feature vectors or hidden intermediate representations. In speech processing systems, NNs may generate scores, such as language model scores, via the forward pass. In such implementations, the NN output can be used to determine the most likely transcription of an utterance.

The parameters of a NN can be set in a process referred to as training. For example, a NN-based language model can be trained using training data that includes input data and the correct or preferred output of the model for the corresponding input data. The NN can repeatedly process the input data, and the parameters (e.g., the weight matrices) of the NN can be modified in what amounts to a trial-and-error process until the model produces (or "converges" on) the correct or preferred output. Illustratively, a correct output of a NN-based language model would be the correct transcription of an utterance represented by the input data. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
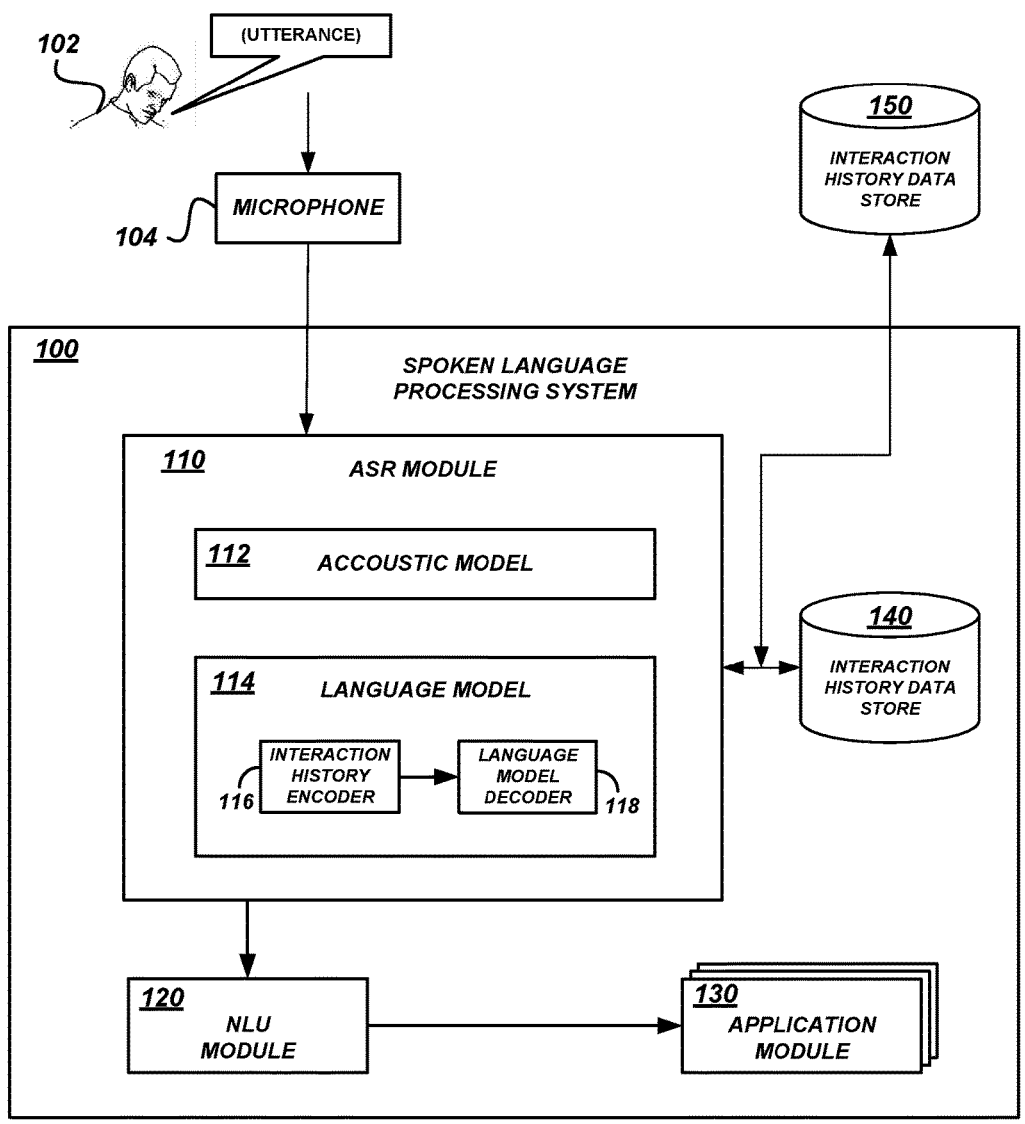
FIG. 1 is a block diagram of an illustrative computing environment including a spoken language processing system implementing an interaction history encoder and language model as neural networks.

The present disclosure is directed to a spoken language processing system that generates encoded representations of historical user interactions with the system, and then uses the encoded representations to improve the accuracy of the system. For example, the system may implement a language model using an artificial neural network ("NN") encoder/decoder configuration. The encoder component can generate encoded representations of historical interactions by individual users, and the jointly-trained decoder component can use the encoded representations to improve the accuracy of language model output for utterances made by the individual users.

Generally described, artificial neural networks, including but not limited to deep neural networks ("DNNs"), have multiple layers of nodes. Illustratively, a NN may include an input layer, and output layer, and any number of intermediate or "hidden" layers between the input and output layers. The individual layers may include any number of separate nodes. Nodes of adjacent layers may be connected to each other, and each connection between the various nodes of adjacent layers may be associated with a respective weight. Conceptually, a node may be thought of as a computational unit that computes an output value as a function of a plurality of different input values, such as the output of a node in a previous layer and a weight associated with a connection between the two nodes. When processing input data in the form of an input vector (e.g., a feature vector comprising information extracted from portions of audio data, information from an acoustic modeling step, etc.), a NN may perform a "forward pass" to generate an output vector. The input vector may include n separate data elements or "dimensions," corresponding to the n nodes of the NN input layer (where n is some positive integer). Each data element may be a value, such as a floating point number or integer. The forward pass includes multiplying the input vector by a matrix representing the weights associated with connections between the nodes of the input layer and nodes of the next layer, and applying a nonlinearity function to the results. The process is then repeated for each subsequent NN layer. Language models implemented as NNs can generate language model scores (e.g., probabilities that input corresponds to a correct transcription of an utterance) by doing a forward pass on feature vectors generated using the output of an acoustic modeling process. A most-likely or "1-best" transcription of an utterance can be selected from a plurality of transcription hypotheses based on the scores generated using the language model (e.g., the transcription hypothesis associated with the highest score, or a score exceeding a threshold, can be selected).

Many conventional ASR systems adjust processing for individual users by classifying or "clustering" groups of users based on commonalties between the users (e.g., usage history, profile or demographic information, etc.). A degree of customization may be provided by using different language models or model parameters for different clusters of users. However, one problem with this approach is that the clustering of users is generally performed separately from the training of the model(s) to be used for the various clusters. For example, the user clustering may be performed using heuristics optimized for a different objective function than the objective function used to train the model(s). In such cases, the trained models may not be optimized for the individual clusters with which they are to be used.

Some aspects of the present disclosure relate to a neural-network-based encoder that generates a fixed-length vector representing a plurality of prior user interactions with the spoken language processing system. The fixed-length vector, which may be referred to as a "usage vector" or "interaction history vector," may be a data structure with a predetermined number of individual data elements or dimensions, such that an n-dimension vector has n individual data elements (wherein n is some positive integer). In some embodiments, the interaction history vector may include encoded information regarding a fixed or variable number of previous utterance transcriptions generated for a particular user. For example, the user may make a plurality of spoken commands or other utterances over a period of time. The spoken language processing system may generate transcriptions of some or all such utterances, take actions based on the transcriptions, etc. In general, the subject of previous utterances by a user, or the specific words used in the previous utterances, may be indicative of the subject of—or words in—a future utterance by the same user. Thus, the spoken language processing system may use transcriptions of previous utterances by the user to help determine the transcriptions of future utterances by the same user.

In processing the transcriptions of prior utterances into a form that is usable by the language model (or some other component of the spoken language processing system) to determine future utterance content, the encoder may take the transcriptions as input and generate a fixed-length encoded representation of the utterances (e.g., a 200-dimension interaction history vector). The internal state of the encoder may be modified during processing of each transcription, and the encoder may persistently maintain the internal state over the course of processing multiple transcriptions. Thus, the interaction history vector generated by processing transcription $W_2$ after processing transcription $W_1$ may be different than the interaction history vector generated by processing transcription $W_2$ without first processing transcription $W_1$. This is because processing transcription $W_1$ changes the persistent internal state of the encoder, thereby changing the way the encoder processes subsequent input. By persistently maintaining internal state information, the encoder can build and continually update an encoded representation of the user's interaction history over the course of many interactions by simply processing each interaction in sequence.

Additionally, because the interaction history vector is fixed-length, it may be thought of as mapping the user to a particular class or cluster of users (or, more specifically, as mapping a particular collection of interactions to a particular class or cluster). For example, if the interaction history vector is a n-dimension vector, any given interaction history vector may be considered to be a mapping of the user (or set of interaction history) to a specific point in n-dimensional space. The fixed-length nature of the interaction history vector means that there are a limited number of values the interaction history vector can take, even though there are a potentially unlimited number of possible interaction history inputs. Thus, users with the same set of interaction history or different sets of interaction history may be mapped to the same point in n-dimensional space. Each point (or collection of points) may be treated as a separate cluster by the decoder component of the language model. The language model can then adjust or otherwise customize language model processing accordingly.

Further aspects of the disclosure relate to jointly training the encoder and decoder components of the language model. By jointly training the encoder and decoder components of the language model, the encoder can be trained to generate interaction history vectors tailored specifically to the generation of language model output, rather than being trained to generate representations of interaction history based on heuristics not directly tied to the operation of the decoder. In some embodiments, training data including interaction history (e.g., transcriptions for a plurality of utterances), language model inputs (e.g., transcription hypotheses comprising sequences of phonemes or other subword units), and corresponding correct transcriptions of the language model inputs may be obtained for each of a variety of different users. For each individual user, the interaction history may be processed by the encoder to generate an interaction history vector, which may then be used by the decoder during processing of the language model inputs to generate test output (e.g., the 1-best transcription, probabilities for individual transcriptions, etc.). The error of the language model processing (e.g., the difference between the test output and the expected output) may then be determined, and the parameters of the neural-network-based decoder may be modified through back propagation to reduce the error or otherwise optimize an objective function value. In addition, back propagation may continue through the neural-network-based encoder to modify the parameters of the encoder based on the same objective function as the decoder. In this way, both the encoder and decoder components are jointly trained to produce accurate language model output using interaction history in addition to conventional language model input.

Various aspects of the disclosure will now be described with regard to certain examples and embodiments, which are intended to illustrate but not limit the disclosure. Although the examples and embodiments described herein will focus, for the purpose of illustration, on the use of transcriptions of prior utterances in the generation of interaction history vectors, the examples are illustrative only and are not intended to be limiting. In some embodiments, other information may be used instead of, or in addition to, transcriptions of prior utterances. For example, user profile information, interactions with other systems (e.g., search engines, shopping applications), and any other user-specific information may be used to generate interaction history vectors or other encoded representations of user-specific data without departing from the spirit of this disclosure.

Example Computing Environment

FIG. 1 illustrates an example environment in which a spoken language processing system 100 may be implemented according to some embodiments. A user 102 may make utterances, such as spoken commands, queries, and the like. A microphone 104 may capture audio of the utterances and generate signals for processing by the spoken language processing system 100. For example, the microphone 104 may generate a signal with information regarding the captured audio of an utterance of the user 102, and the spoken language processing system 100 may process the signal to generate a transcription of the utterance and take some action in response to the utterance.

The microphone 104 may be integrated with, or in wired or wireless communication with, the spoken language processing system 100. In some embodiments, the microphone 104 may be integrated with, or in wired or wireless communication with, a client device separate from the spoken language processing system 100. For example, a user may make utterances captured by the microphone 104 of a client device, and the client device may provide a microphone 104 signal (or information derived therefrom) to the spoken language processing system 100. The client device can correspond to a wide variety of electronic devices, such as a computing device that includes one or more processors and a memory which may contain software applications executed by the processors. Illustratively, the client device may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

The spoken language processing system 100 can be or include any computing system, such as server computing device, desktop computing device, mainframe computer, some combination thereof, etc. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an ASR module 110, an NLU module 120, and one or more application modules 130. The spoken language processing system may also include an interaction history data store 140 and/or be in communication with one or more network-accessible interaction history data stores 150. In some embodiments, the spoken language processing system 100 can include various modules and components combined on a single device, multiple instances of a single module or component, etc. For example, the spoken language processing system 100 may include a separate database server that may be configured with a data store for ASR models, NLU models, interaction history data 140, etc.; a server or group of servers configured with both ASR and NLU modules 110, 120; and a server or group of servers configured with applications 130. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The ASR module 110 may include acoustic model 112 to be used on acoustic features of audio data (e.g., a signal generated by the microphone 104) to generate transcription hypotheses regarding which word or subword units (e.g., phonemes) correspond to an utterance represented by the audio data. The ASR module 110 may also include a language model 114 to be used to determine the most likely transcription of the utterance using the acoustic model hypotheses.

The language model 114 may be implemented as (or may include) an interaction history encoder 116 and a language model decoder 118 that may be physically or logically separate from each other. Illustratively, the interaction history encoder 116 and language model decoder 118 may be implemented as separate neural networks, or as separate portions of a single neural network. The language model 114 can obtain interaction history data from the interaction history data store 140/150 and/or from prior output of the language model 114. The interaction history encoder 116 may then generate an encoded representation of the interaction history data for use by the language model decoder 118 when producing language model output, as described in greater detail below.

Example Process for Using a Neural Network Encoder/ Decoder Language Model

Figure 2:
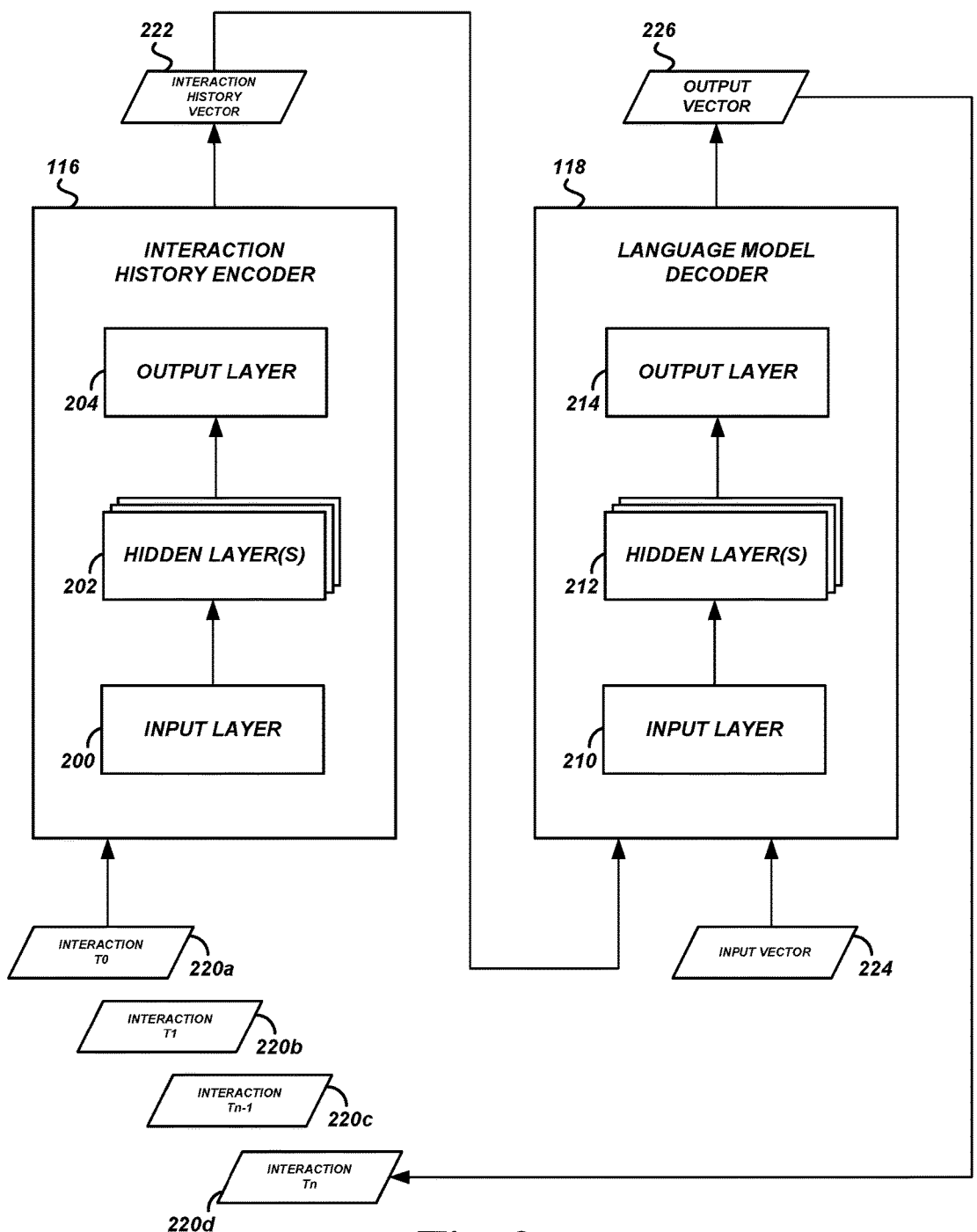
FIG. 2 is a block diagram of an interaction history encoder and language model implemented as neural networks according to some embodiments.
Figure 3:
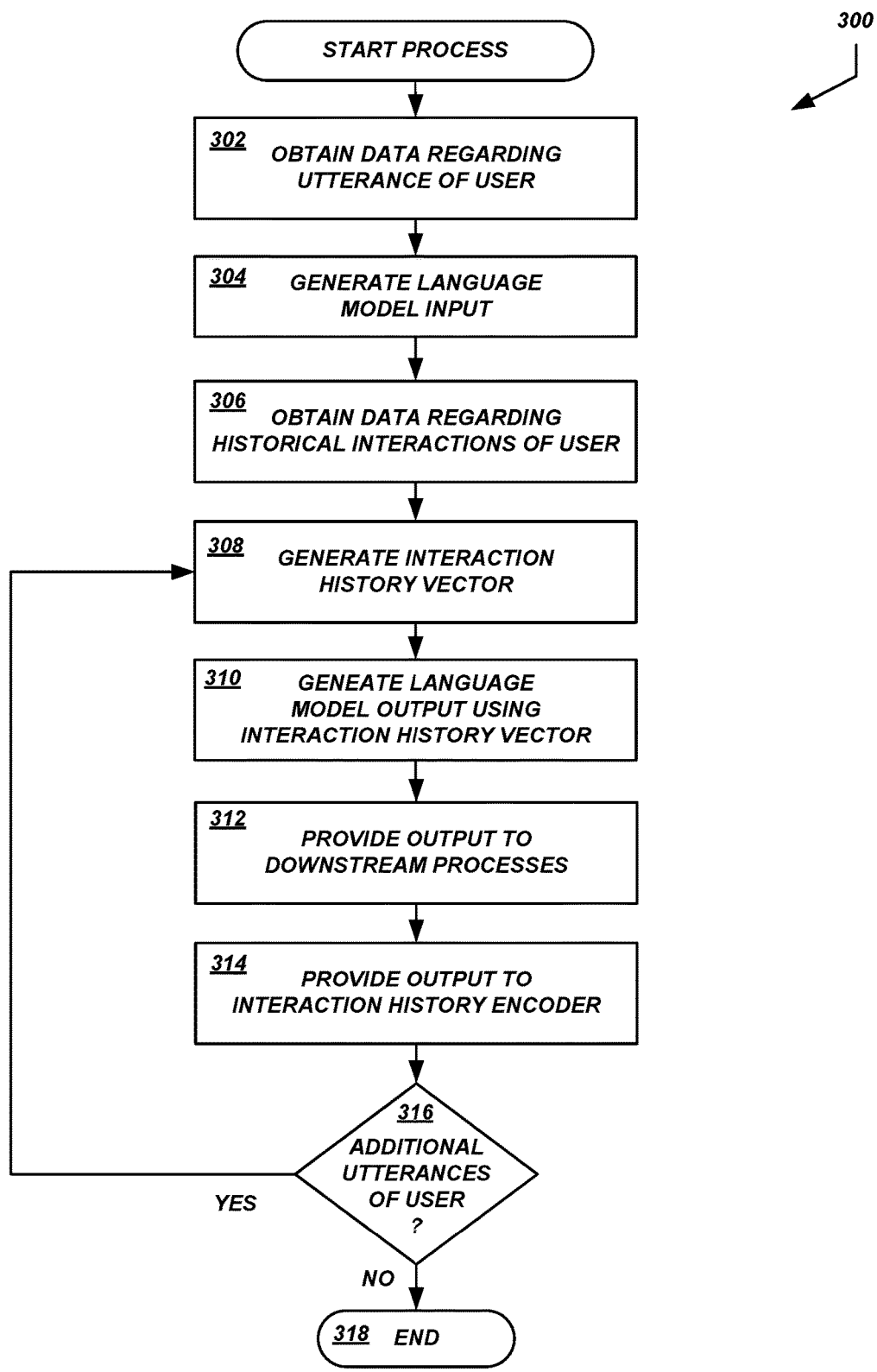
FIG. 3 is a flow diagram of an illustrative process for using an interaction history encoder with a language model according to some embodiments.

FIG. 2 is a block diagram of a language model 114 showing interactions and data flows between the NN-based interaction history encoder 116 and neural-network-based language model decoder 118 components. FIG. 3 is a flow diagram of an illustrative process 300 for using such a language model 114 during ASR processing. The process 300 may be embodied in a set of executable program instructions stored on a computer-readable medium, such as one or more disk drives, of a computing system, such as the computing system 500 shown in FIG. 5 and described in greater detail below. When the process 300 is initiated, the executable program instructions can be loaded into memory, such as RAM, and executed by one or more processors of the computing system. Although the process 300 is described with respect to the computing system 500 shown in FIG. 5, the description is illustrative only and is not intended to be limiting. In some embodiments, the process 300 or portions thereof may be performed serially or in parallel by multiple computing systems.

At block 302, the computing device 500 or some other component of the spoken language processing system 100 can obtain data regarding an utterance of a user. In some embodiments, as shown in FIG. 1, a user 102 may make an utterance, and a microphone may generate a signal including information regarding the utterance, such as audio data. The ASR module 110 or some other component of the spoken language processing system 100 may process the signal to, e.g., generate a sequence of feature vectors that include data regarding the acoustic features of the utterance. Typical input feature vectors for speech recognition include mel frequency cepstral coefficients ("MFCCs"), perceptual linear predictions ("PLPs"), and the like. In one specific non-limiting embodiment, the input vectors may be logarithmic Mel-filter bank energy ("LFBE") vectors, where the acoustic features represented in the input vector are LFBEs. An LFBE vector represents the level of energy in various frequency bands of a signal frame (e.g., a 20 millisecond sample window of the signal). For example, an LFBE vector may be of length twenty and indicate the energy in twenty different frequency bands. The frequency bands may be spaced linearly, or may be on a mel scale (e.g., spaced such that they perceived by listeners to be equally spaced, even though they are not equally spaced from a mathematical point of view).

At block 304, the computing device 500 or some other component of the spoken language processing system 100 can generate language model input. In some embodiments, the ASR module 110 may process the feature vectors generated in block 302, above, using the acoustic model 112 to generate hypotheses regarding the words in the utterance. For example, the acoustic model 112 may generate probabilities that individual feature vectors or frames correspond to particular words or subword units (e.g., phonemes, triphones, n-grams, etc.). The ASR module 110 may then use the probabilities to generate the hypotheses regarding the words in the utterance. Illustratively, the hypotheses may be sequences of words or subword units in the form of a lattice or n-best list. The ASR module 110 may then generate input vectors for the language model 114 using the hypotheses. For example, a single language model input vector may include information about a portion of a particular hypothesis, such as a word or an n-gram word embedding. In some embodiments, other information may be alternately or additionally provided, such as data regarding the context of a word or subword unit within the hypothesis (e.g., the preceding or following word or subword unit); an indicator of the ordinal position of the word or subword unit, and/or various other data.

At block 306, the computing device 500 or some other component of the spoken language processing system 100 can obtain data regarding one or more historical interactions of the user. The data may be obtained from a historical interaction data store, such as a historical interaction data store 140 used by the spoken language processing system 100 to store information about user interactions with the system 100 (e.g., transcriptions of previous utterances, actions taken in response to the utterances, etc.). In some embodiments, a transcription of one or more previous utterances may be maintained by the ASR module 110 rather than stored in—and retrieved from—a separate data store 140. In some embodiments, the historical interaction data may be obtained from a historical interaction data store 150 that is separate from the spoken language processing system 100, such as database of search queries initiated by the user, purchases made by the user, content accessed by the user, etc.

At block 308, the computing device 500 or some other component of the spoken language processing system 100 can generate an encoded representation of the interaction history. In some embodiments, as shown in the FIG. 2, a neural-network-based interaction history encoder 116 may be used to generate the encoded representation as a fixed-length interaction history vector 222. For example, an input vector 220a that corresponds to a particular historical interaction of the user with the system 100 may be input into the interaction history encoder 116 at the input layer 200. The input vector 220 may include speech processing results for a prior utterance of the user (e.g., a lattice or 1-best transcription of the utterance generated previously by the ASR module 110, natural language understanding or "NLU" information associated with the utterance, etc.), information about actions taken by the spoken language processing system 100 in response to the utterance (e.g., dialog responses and other actions), information regarding non-utterance-based interactions with other systems (e.g., shopping history, content browsing history, etc.), and the like.

The interaction history encoder 116 may perform a forward pass using the input vector 220a, processing the input vector 220a through any hidden layers 202 and ultimately producing output at the output layer 204. For example, the interaction history encoder 116 may compute one or more numerical values from portions of a transcription or other information in the input vector 220a, multiply the numerical values by a weight matrix representing connections between the input layer and the first hidden layer of the interaction history encoder 116, compute an activation function value using the weighted numerical values, and repeat the process for subsequent hidden layers and/or the output layer of the interaction history encoder 116.

In some embodiments, the interaction history encoder 116 may be a recurrent neural network ("RNN") that persistently maintains state information between forward passes. For example, the interaction history encoder 116 may perform a forward pass on input vector 220b, which corresponds to an utterance transcription generated at time $T_1$. During the forward pass, the internal calculations of the NN may be performed as a function of the input vector 220b (or some portion thereof), the weight matrix/matrices of the interaction history encoder 116, and also information regarding the internal calculations (or some portion thereof) performed during a prior forward pass using input vector 220a, which corresponds to an utterance transcription generated at prior time $T_0$. In this way, the NN processing of input vector 220b is affected by the prior processing of input vector 220a. The interaction history encoder 116 can then store information about the internal calculations performed using the input vector 220b for use in processing subsequent input vectors. This process may be repeated for any number of subsequent input vectors, up to input vector 220c, which in this example corresponds to an utterance transcription generated a at time $T_{n-1}$ (the utterance transcription generated immediately prior to processing the current utterance during this execution of the process 300 at time $T_n$).

In some embodiments, the interaction history encoder 116 may serialize its persistent internal state, or some portion thereof, to a binary large object ("BLOB") or some other data structure. The serialized persistent internal state information can then be stored in a local data store or a network-accessible data store. Illustratively, the serialized persistent internal state information may be stored in connection with an identifier of the specific user whose interaction history vector 222 was generated. Subsequently, when the same user makes an utterance to be processed by the ASR module 100, the user may be identified (e.g., using a user name, a speaker ID module, etc.), and the BLOB or other serialized state information may be obtained from the local or network-accessible data store. The interaction history encoder 116 may then de-serialize the persistent internal state information to restore the internal state of the interaction history encoder 116 to the state in which it existed after producing the previous interaction history vector 222 for the same user. In this way, a single interaction history encoder 116 (or a fleet of multiple interaction history encoders executing on different devices) can produce interaction history vectors 222 for different users at different times based on a persistent internal states specific to each user.

In some embodiments, the interaction history encoder 116 can use certain techniques to ensure that the persistent internal state of the neural network represents the long term interaction history of the user, rather than primarily representing the most recent interactions. For example, the interaction history encoder 116 can be implemented using a Long Short-Term Memory ("LSTM") network. An LSTM network is a variant of a RNN that maintains the effect of past information on future processing by adaptively controlling the information flow inside the network. As opposed to regular RNN structures for persistently maintaining internal state, the information flow in LSTM networks is controlled to make the networks capable of handling and remembering long-term dependencies, or "contexts." This is done by through the use of memory cells and gating units. As another example, the interaction history encoder can be implemented using gated recurrent units ("GRU"). Similar to units in an LSTM network, a GRU modulates the flow of information inside the unit. However, unlike LSTM networks, GRU-based networks do not have separate memory cells, which can help improve scalability.

At block 310, the computing device 500 or some other component of the spoken language processing system 100 can generate language model output. For example, the ASR module 110 can use the language model decoder 118 in scoring individual transcription hypotheses and selecting the 1-best ASR output (e.g., the transcription most likely to be correct) for the current audio input. The ASR module 110 can score the individual transcription hypotheses by using language model decoder 118 to process language model input vectors 224, generated at block 304 for the individual hypotheses, and an interaction history vector 222, generated at block 308. Illustratively, the language model output for any given input vector 224 may include an output vector 226 of probabilities that the input vector 224 corresponds to each word of the language modeled by the language model 114. Such an output vector 226 may be used by a downstream process of the ASR module 114 to compute "scores" or total probabilities for each transcription hypothesis and select the most likely transcription of the current utterance.

The language model decoder 118 may perform a forward pass using the input vector 224 and interaction history vector 222 to generate the output vector 226. For example, the input vector 224 may be input into the language model decoder at the input layer 210. The input vector 224 may include information about a portion of a hypothesis generated using the acoustic model 112 (e.g., a word or n-gram). The language model decoder 118 can process the input vector 224 through any hidden layers 212 and ultimately produce output at the output layer 214. In performing the forward pass on the input vector 224 through the hidden layers 212, the language model decoder 118 may include the interaction history vector 222 as an additional input (e.g., into the input layer 210 in connection with the input vector 224, into a hidden layer 212 separately from the input vector 224, etc.). Individual calculations of the language model decoder may 118 be then calculated as a function of the input vector 224 (or some portion thereof) and the interaction history vector 222 (or some portion thereof). Thus, the interaction history vector 222 can affect the internal calculations and ultimately the output of the language model decoder 118. Because the language model decoder 118 is trained specifically to use the interaction history vector 222, and because the interaction history encoder 116 is jointly trained with the language model decoder 118 specifically to generate the interaction history vector 222 for use by the language model decoder 118, the interaction history vector 222 can improve the accuracy of language model 114 output 226 (assuming the training data reasonably represents the interactions and utterances seen by the deployed system 100).

At block 312, the computing device 500 or some other component of the spoken language processing system 100 can provide the language model output 226 to downstream processes for further processing. For example, the ASR module 110 can use the language model output 226 to determine a most-likely transcription of the utterance. An NLU module 120 can use the transcription to determine the intent of the user in making the utterance. An application module 130 can be employed to perform an action to be taken in response to the utterance.

At block 314, the computing device 500 or some other component of the spoken language processing system 100 can provide interaction history data to the interaction history encoder 116 or interaction history data store 140. In some embodiments, the transcription 230 of the utterance may be provided to the interaction history encoder 116 so that an updated interaction history vector may be generated.

At decision block 316, the computing device 500 or some other component of the spoken language processing system 100 can determine whether input corresponding to another utterance has been received. If so, the process 300 can return to block 308. Otherwise, if no subsequent utterance input has been received, the process can end at block 318.

Although FIG. 3 shows blocks 302, 304, 306, and 308 being executed in a sequential manner, in some embodiments these blocks may be executed asynchronously or in parallel. For example, blocks 302 and 304 may be executed in response to receipt of new input to the spoken language processing system 100, such as receipt of a signal corresponding to an utterance of a user 102. However, blocks 306 and 308 may not be executed sequentially after block 304, but rather in parallel with blocks 302 and 304. In this way, the interaction history vector 222 may be ready for use by the language model decoder 118 when the language model input vector 224 is ready (or as soon as possible thereafter). In some embodiments, blocks 306 and 308 may be executed at some point after block 310, described below, or as part of some process separate from the process 300. Thus, an up-to-date interaction history vector 222 may be ready even before a subsequent utterance is made by the user 102.

Example Process for Training a Neural Network Encoder/Decoder Language Model

Figure 4:
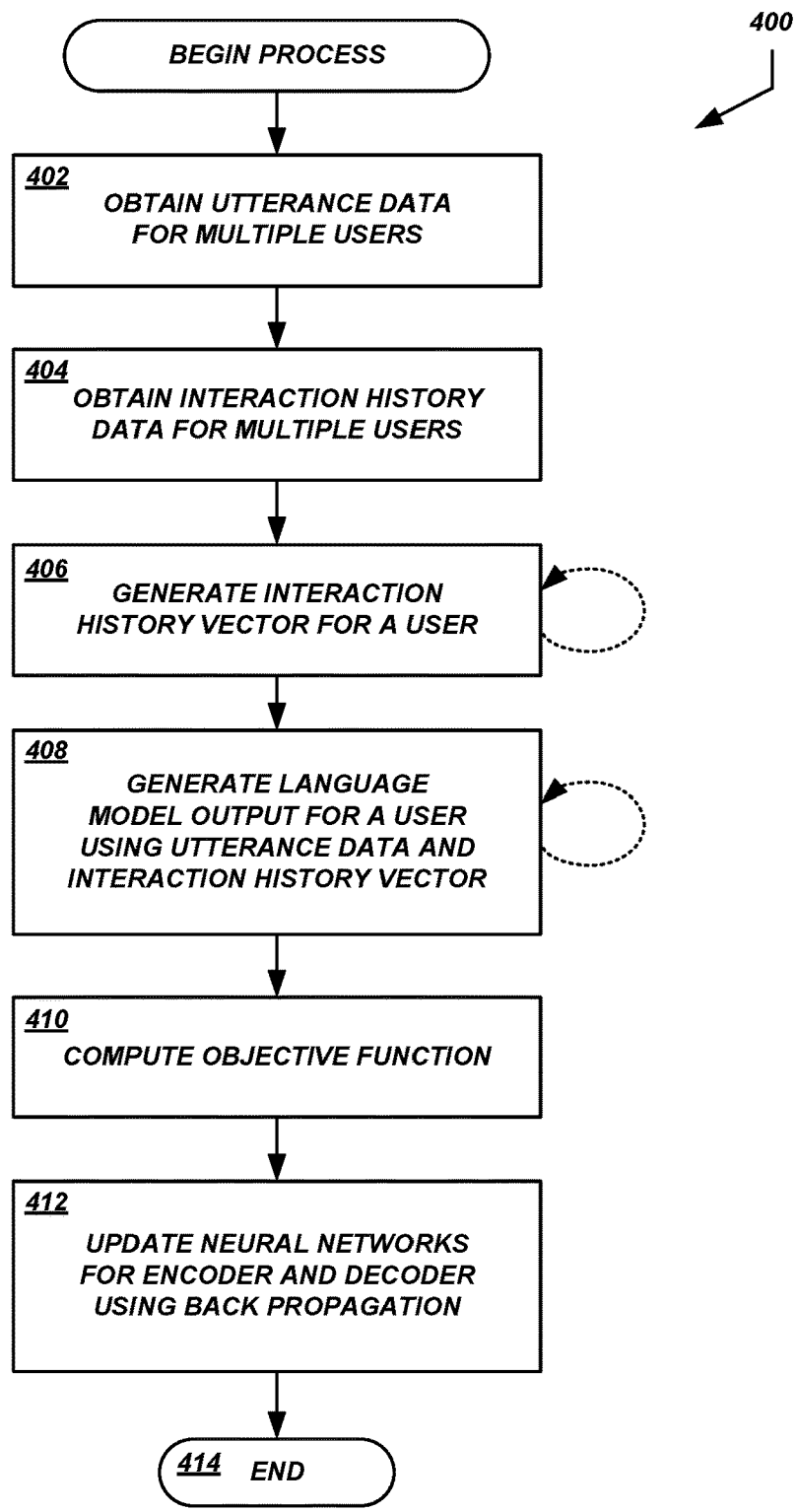
FIG. 4 is a flow diagram of an illustrative process for training an interaction history encoder with a language model according to some embodiments.

FIG. 4 is a flow diagram of an illustrative process 400 for training a language model 114 implemented as a neural-network-based interaction history encoder 116 and neural-network-based language model decoder 118. The process 400 may be embodied in a set of executable program instructions stored on a computer-readable medium, such as one or more disk drives, of a computing system, such as the computing system 500 shown in FIG. 5 and described in greater detail below. When the process 400 is initiated, the executable program instructions can be loaded into memory, such as RAM, and executed by one or more processors of the computing system. Although the process 400 is described with respect to the computing system 500 shown in FIG. 5, the description is illustrative only and is not intended to be limiting. In some embodiments, the process 400 or portions thereof may be performed serially or in parallel by multiple computing systems.

At block 402, the computing device 500 or some other component of the spoken language processing system 100 can obtain utterance data for each user of a group of users. The utterance data may be in the form of language model input vectors, as described above (e.g., vectors that each include a word or an n-gram word embedding), and may therefore be input directly into the language model 114 during training. In some embodiments, the utterance data may be in the form of hypotheses generated using an acoustic model (e.g., lattices or n-best lists), feature vectors for input into an acoustic model, audio signals, or the like. In such cases, the utterance data may be processed by the ASR module 110 to produce language model input vectors for use in training the language model 114.

At block 404, the computing device 500 or some other component of the spoken language processing system 100 can obtain interaction history data for individual users of the group of users. The interaction history data for a particular user may be in the form of transcriptions of utterances made by the user. In some embodiments, the interaction data may additionally or alternatively include other information, as described in greater detail above.

At block 406, the computing device 500 or some other component of the spoken language processing system 100 can generate an interaction history vector for a particular user. The interaction history encoder 116 may generate the interaction history vector by sequentially processing the interaction history, as described in greater detail above. For example, if transcriptions for 50 prior utterances of the user are obtained, the interaction history encoder may sequentially process each of the 50 transcriptions to generate a single interaction history vector based on all 50 transcriptions.

At block 408, the computing device 500 or some other component of the spoken language processing system 100 can generate language model output for the language model input vectors obtained or generated above at block 402. The language model decoder 118 can process the individual input vectors using the interaction history vector generated above at block 406.

At block 410, the computing device 500 or some other component of the spoken language processing system 100 can compute an objective function value for language model output generated above at block 410. Illustratively, the objective function may be a classification-based objective function, such as cross entropy. Generally described, computing the objective function value involves comparing, for a given training data input, the actual language model output with the expected or correct output to determine a difference or measure of error in the actual output. A NN is trained using such an objective function by modifying the parameters (e.g., weights) of the neural network to minimize the error.

At block 412, the computing device 500 or some other component of the spoken language processing system 100 can perform back propagation to update parameters of both the language model decoder 118 and the interaction history encoder 116. The computing system 500 can compute updates to the parameters of the encoder and decoder NNs by computing the gradient of the objective function with respect to the individual parameters of the NNs. The gradient can be computed as the derivative of the objective function with respect to any weight in the NNs. This gradient can be used to modify the parameters (e.g., the weights) of the nodes of the NNs to reduce the error of the NNs (e.g., the difference between the actual output for a given input and the correct or preferred output for the input), as determined using the objective function.

Illustratively, in the neural-network-based language model decoder 118, an activation function for a particular hidden layer node j, connected to a node i from a previous layer and also connected to a node k in the output layer, may be a sigmoid function. The sigmoid function may take, as input, the product of a weight and the output of node i from the previous layer. The computing system 500 can determine the derivative of the objective function at output layer node k with respect to the output of the hidden layer node j by determining the derivative of the objective function with respect to the sigmoid function applied to the weighed input value. This process may be repeated for each pair of connected nodes that includes a node from the output layer and a node from the immediately preceding hidden layer to which the output layer node is connected. Once the gradient is computed, the computing system 500 can determine and apply the updates to the individual parameters of the NN using back propagation. In back propagation, the output error is propagated back through the layers of the NN, and the gradient is used at each node to determine parameter updates that will reduce the error (e.g., using gradient descent). For example, the process described above, for determining updates to hidden layer node parameters based on the output of output layer nodes to which the hidden layer nodes are connected, may be repeated for each connected pair of inter-hidden-layer nodes (e.g., for each pair of connected nodes from one hidden layer and the immediately preceding hidden layer, and so on). The back propagation process may continue back through the layers of the inter-action history encoder 116 so that it is jointly trained with the language model decoder 118.

In some embodiments, the parameter updates determined for an individual input vector or a single training process forward pass may be applied to the model parameters before processing the next input vector or performing the next forward pass. If there are additional input vectors in the training data, the process 400 may then return to block 408 and repeat blocks 408-412 for each input vector of the training data. In some embodiments, the parameter updaters for the entire set of training data, or for subsets of training data, may be aggregated before applying them to the model parameters. In these embodiments, blocks 408 and 410 may be repeated for each input vector of the training data or current subset before the aggregated updates are applied at block 412. Processing may then return to block 406 if there are additional subsets of training data to process (e.g. for additional users), or if all training data is to be processed again.

Execution Environment

Figure 5:
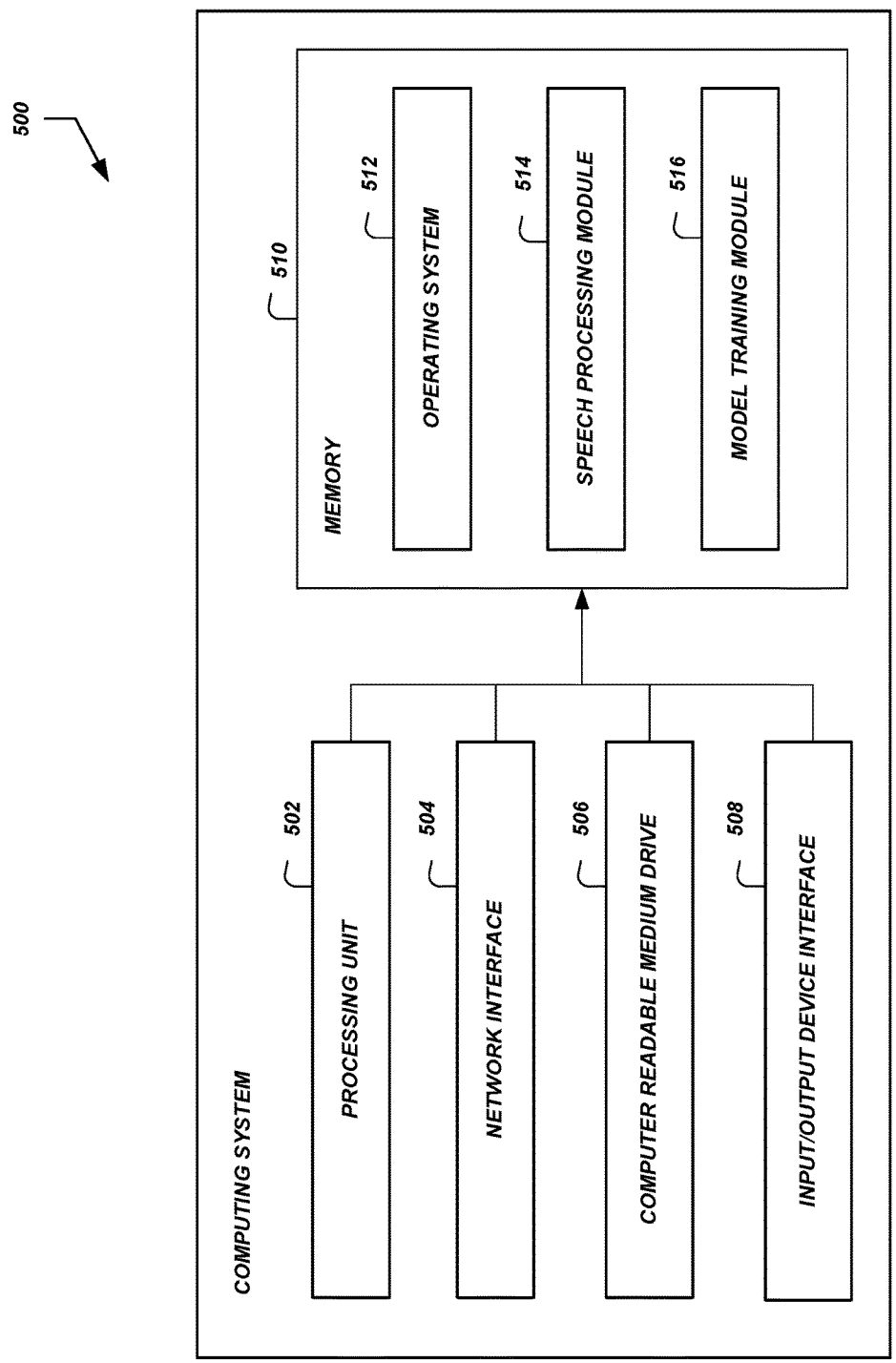
FIG. 5 is a block diagram of an illustrative computing system configured to implement an interaction history encoder and language model according to some embodiments.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 512 that provides computer program instructions for use by the computer processor 502 in the general administration and operation of the computing system 500. The computer readable memory 510 can further include computer program instructions and other information for implementing aspects of the present disclosure. For example, in one embodiment, the computer readable memory 510 may include a speech processing module 514 that performs the process 300 described above (or portions thereof) using a language model configured as neural-network-based encoder and decoder components. As another example, the computer-readable memory 510 may include a model training module 516 that performs the process 400 described above (or portions thereof) to train the language model. In some embodiments, multiple computing systems 500 may communicate with each other via their respective network interfaces 504, and can implement speech processing and/or model training separately (e.g., each computing system 500 may execute one or more separate instances of the processes 300 and/or 400), in parallel (e.g., each computing system 500 may execute a portion of a single instance of a process 300 and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more computer processors in communication with the computer-readable memory, wherein the one or more computer processors are programmed by the executable instructions to at least:
      obtain (1) a first transcription of a first utterance of the user and (2) a second transcription of a second utterance of the user;
      generate a first interaction history vector using a neural-network-based interaction history encoder, the first transcription, and data representing a non-verbal interaction of the user with displayed content, wherein the first interaction history vector comprises a first plurality of values, wherein individual values of the first plurality of values are determined using the first transcription and the data representing the non-verbal interaction, and wherein generating the first interaction history vector modifies a persistent internal state of the interaction history encoder;
      store state data regarding the persistent internal state of the interaction history encoder;
      obtain audio data regarding a current utterance of a user;
      generate a plurality of transcription hypotheses for the current utterance using the audio data and an acoustic model;
      restore the persistent internal state of the interaction history encoder using the state data;
      generate a second interaction history vector using the interaction history encoder and the second transcription, wherein the second interaction history vector comprises a second plurality of values, wherein individual values of the second plurality of values are determined using the persistent internal state of the interaction history encoder and the second transcription, and wherein the second interaction history vector represents a cluster of a plurality of clusters of users;
      generate a first score for a first transcription hypothesis of the plurality of transcription hypotheses using a neural-network-based language model decoder and the second interaction history vector, wherein the first score is generated as a function of (1) a first value representing at least a portion of the first transcription hypothesis, (2) a second value of the second plurality of values of the second interaction history vector, and (3) the cluster; and
      select the first transcription hypothesis as a transcription of the current utterance based on the first score being greater than a second score associated with a second transcription hypothesis of the plurality of transcription hypotheses.

2. The system of claim 1, wherein the wherein the instructions to generate the first interaction history vector comprise instructions to:
   convert at least a portion of the first transcription to a numerical value; and
   perform one or more calculations using the numerical value and a weight matrix of the interaction history encoder to determine a value of the first plurality of values, wherein the interaction history encoder comprises a first layer of nodes and a second layer of nodes, wherein the weight matrix comprises weights associated with connections between (1) nodes in the first layer of nodes and (2) nodes in the second layer of nodes.

3. The system of claim 1, wherein the executable instructions to generate the second interaction history vector comprise instructions to:
   convert at least a portion of the second transcription to a numerical value; and
   perform one or more calculations using the numerical value, a weight matrix of the interaction history encoder, and a value from the persistent internal state of the interaction history encoder to determine a value of the second plurality of values, wherein the interaction history encoder comprises a first layer of nodes and a second layer of nodes, and wherein the weight matrix comprises weights associated with connections between (1) nodes in the first layer of nodes and (2) nodes in the second layer of nodes.

4. The system of claim 1, wherein the executable instructions to generate the first score for the first transcription hypothesis comprise instructions to:
   convert at least a portion of the first transcription hypothesis to a numerical value; and
   perform one or more calculations using the numerical value, a value of the second plurality of values of the second interaction history vector, and a weight matrix of the language model decoder to determine a value for the first score.

5. A computer-implemented method comprising:
   as performed by one or more computing devices configured with specific computer-executable instructions,
      generating language model input data regarding an utterance of a user, wherein the language model input data is generated using an acoustic model and audio data regarding the utterance, and wherein the language model input data is associated with a plurality of transcription hypotheses for the utterance;
      obtaining interaction history data regarding a prior interaction of the user with a computing system;
      obtaining encoder state data regarding an internal state of a neural-network-based encoder reached during generation of a prior interaction history vector for the user;
      restoring the internal state of the neural-network-based encoder using the encoder state data;

processing at least a portion of the interaction history data using the neural-network-based encoder to generate an interaction history vector, wherein the interaction history vector comprises an encoded representation of at least a portion of a plurality of prior interactions of the user, and wherein the plurality of prior interactions comprises a verbal interaction, and a separate non-verbal interaction with displayed content;

processing the language model input data and the interaction history vector using a neural-network-based decoder to generate scores for individual transcription hypotheses of the plurality of transcription hypotheses; and selecting a transcription of the utterance using the scores for the individual transcription hypotheses.

6. The computer-implemented method of claim 5, wherein processing the language model input data and the interaction history vector using the neural-network-based decoder comprises performing one or more calculations using (1) a first value associated with a first transcription hypothesis of the plurality of transcription hypotheses, (2) a second value of the interaction history vector, and (3) a weight matrix of the neural-network-based decoder to determine a first score for the first transcription hypothesis.

7. The computer-implemented method of claim 5, wherein the interaction history vector comprises a mapping of the interaction history data to a first point in n-dimensional space, wherein n is a positive integer.

8. The computer-implemented method of claim 5, wherein the interaction history data comprises data representing at least one of: an utterance, a search request, a purchase, or content access.

9. The computer-implemented method of claim 5, wherein the neural-network-based encoder comprises a plurality of layers of nodes, and wherein a first value associated with a first node of a first layer of the plurality of layers is modified during processing the portion of the interaction history data, and wherein a persistent internal state of the neural-network-based encoder comprises the first value.

10. The computer-implemented method of claim 9, further comprising:

storing, at a network-accessible data store separate from the one or more computing devices, second encoder state data regarding the internal state of the neural-network-based encoder subsequent to generating the interaction history vector;

obtaining second interaction history data;

obtaining, from the network-accessible data store, the second encoder state data;

restoring the internal state of the neural-network-based encoder using the second encoder state data;

converting at least a portion of the second interaction history data to a numerical value; and performing one or more calculations using the numerical value, a weight matrix of the neural-network-based encoder, and a value from the internal state of the neural-network-based encoder, wherein the neural-network-based encoder comprises a first layer of nodes and a second layer of nodes, and wherein the weight matrix comprises weights associated with connections between (1) nodes in the first layer of nodes and (2) nodes in the second layer of nodes.

11. The computer-implemented method of claim 5, further comprising training the neural-network-based encoder jointly with the neural-network-based decoder, wherein the training comprises:

computing a gradient of an objective function, wherein the objective function represents a measure of error in output of the neural-network-based decoder;

modifying a value of a parameter of the neural-network-based decoder by an amount indicated by the gradient, wherein the gradient indicates a degree to which the objective function changes with respect to a change in the parameter; and modifying a value of a parameter of the neural-network-based encoder by an amount indicated by the gradient.

12. The computer-implemented method of claim 5, further comprising:

generating a first interaction history vector using first interaction data regarding the verbal interaction, wherein the verbal interaction comprises an utterance; and generating a second interaction history vector using second interaction data regarding the non-verbal interaction, wherein the non-verbal interaction comprises a purchase event, a search event, or a content access event.

13. A system comprising:

a computer-readable memory storing executable instructions; and one or more computer processors in communication with the computer-readable memory, wherein the one or more computer processors are programmed by the executable instructions to perform a process comprising:

generating language model input data regarding an utterance of a user, wherein the language model input data is generated using an acoustic model and audio data regarding the utterance;

obtaining state data regarding an internal state of a neural-network-based encoder reached during generation of a prior interaction history vector for the user;

generating an interaction history vector using the neural-network-based encoder and the state data, wherein the interaction history vector comprises an encoded representation of a plurality of prior interactions of the user, and wherein the plurality of prior interactions comprises: a verbal interaction, and a separate non-verbal interaction with displayed content;

processing the language model input data and the interaction history vector using a neural-network-based decoder to generate scores for individual transcription hypotheses of a plurality of transcription hypotheses; and selecting a transcription of the utterance using the scores for the individual transcription hypotheses.

14. The system of claim 13, wherein processing the language model input data and the interaction history vector using the neural-network-based decoder comprises performing one or more calculations using (1) a first value associated with a first transcription hypothesis of the plurality of transcription hypotheses, (2) a second value of the interaction history vector, and (3) a weight matrix of the neural-network-based decoder to determine a first score for the first transcription hypothesis.

15. The system of claim 13, wherein the interaction history vector comprises a mapping of data regarding the plurality of prior interactions of the user to a first point in n-dimensional space, wherein n is a positive integer.

16. The system of claim 15, wherein the data regarding the plurality of prior interactions of the user comprises data representing at least one of: an utterance, a search request, a purchase, or content access.

17. The system of claim 13, wherein the neural-network-based encoder comprises a plurality of layers of nodes, and wherein a first value associated with a first node of a first layer of the plurality of layers is modified during processing the portion of the interaction history data, and wherein the internal state of the neural-network-based encoder comprises the first value.

18. The system of claim 17, wherein the one or more computer processors are further programmed by the executable instructions to perform a process comprising:
storing, at a network-accessible data store separate from the one or more computing devices, second encoder data regarding the internal state of the neural-network-based encoder subsequent to generating the interaction history vector;
obtaining interaction history data regarding a second plurality of prior interactions of the user;
obtaining, from the network-accessible data store, the second encoder data;
restoring the internal state of the neural-network-based encoder using the second encoder data; and
performing one or more calculations using the interaction history data, a weight matrix of the neural-network-based encoder, and the first value, wherein the weight matrix comprises weights associated with connections between (1) nodes in the first layer and (2) nodes in a second layer of the plurality of layers.

19. The system of claim 17, wherein the one or more computer processors are further programmed by the executable instructions to perform a process comprising:
computing a gradient of an objective function, wherein the objective function represents a measure of error in output of the neural-network-based decoder;
modifying a value of a parameter of the neural-network-based decoder by an amount indicated by the gradient, wherein the gradient indicates a degree to which the objective function changes with respect to a change in the parameter; and
modifying a value of a parameter of the neural-network-based encoder by an amount indicated by the gradient.

20. The system of claim 13, wherein the verbal interaction relates to a speech recognition result generated from audio data representing an utterance, and wherein the non-verbal interaction relates to a purchase event, a search request event, or a content access event.

* * * * *

UNITED STATES PATENT AND TRADEMARK OFFICE
CERTIFICATE OF CORRECTION

PATENT NO. : 10,032,463 B1
APPLICATION NO. : 14/982587
DATED : July 24, 2018
INVENTOR(S) : Ariya Rastrow et al.

Page 1 of 1

It is certified that error appears in the above-identified patent and that said Letters Patent is hereby corrected as shown below:

On the Title Page

In the illustrative figure, Ref. Numeral 112, Line 1, change "ACCOUSTIC" to --ACOUSTIC--.

In the Drawings

On Sheet 1 of 5, (Fig. 1), Reference 112, Line 1, please change "ACCOUSTIC" to --ACOUSTIC--.

On Sheet 3 of 5, (Fig. 3), Reference 310, Line 1, please change "GENEATE" to --GENERATE--.

In the Claims

In Column 16, Line 10, Claim 2, after "wherein the" delete "wherein the".

Signed and Sealed this
Second Day of July, 2019

Andrei Iancu
*Director of the United States Patent and Trademark Office*